United States Patent
Jun et al.

(10) Patent No.: US 9,520,233 B2
(45) Date of Patent: Dec. 13, 2016

(54) ELECTRONIC COMPONENT AND BOARD HAVING THE SAME

(71) Applicant: SAMSUNG ELECTRO-MECHANICS CO., LTD., Suwon-si, Gyeonggi-do (KR)

(72) Inventors: Kyoung Jin Jun, Suwon-si (KR); Su Jung Kim, Suwon-si (KR); Young Ghyu Ahn, Suwon-si (KR); Sang Soo Park, Suwon-si (KR); Heung Kil Park, Suwon-si (KR); Soon Ju Lee, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/003,614

(22) Filed: Jan. 21, 2016

(65) Prior Publication Data

US 2016/0217926 A1    Jul. 28, 2016

(30) Foreign Application Priority Data

Jan. 22, 2015   (KR) .................. 10-2015-0010568

(51) Int. Cl.
*H01G 4/228*   (2006.01)
*H01G 4/30*    (2006.01)

(52) U.S. Cl.
CPC ............ *H01G 4/228* (2013.01); *H01G 4/30* (2013.01)

(58) Field of Classification Search
CPC ........... H01G 4/30; H01G 4/228; H01G 2/06
See application file for complete search history.

(56) References Cited

U.S. PATENT DOCUMENTS

| 6,288,887 | B1 | 9/2001 | Yoshida et al. | |
| 2009/0296311 | A1* | 12/2009 | Otsuka | H01G 2/065 361/306.3 |
| 2010/0123995 | A1* | 5/2010 | Otsuka | H01G 2/06 361/308.1 |
| 2014/0016242 | A1* | 1/2014 | Hattori | H01G 2/06 361/303 |
| 2014/0124256 | A1* | 5/2014 | Hattori | H01G 2/065 174/260 |
| 2014/0268486 | A1* | 9/2014 | Hattori | H01G 4/308 361/301.4 |

(Continued)

FOREIGN PATENT DOCUMENTS

| JP | 2000-235932 A | 8/2000 |
| KR | 10-2013-0116421 A | 10/2013 |
| KR | 10-2014-0141134 A | 12/2014 |

*Primary Examiner* — Hoa C Nguyen
*Assistant Examiner* — Amol Patel
(74) *Attorney, Agent, or Firm* — McDermott Will & Emery LLP (57) ABSTRACT

An electronic component and a board having the same are provided. The electronic component according to an exemplary embodiment in the present disclosure may include a body having upper and lower surfaces, first and second side surfaces, and third and fourth side surfaces; external electrodes disposed on at least one of the upper and lower surfaces and the third and fourth side surfaces of the body; and connection terminals disposed on the external electrodes, wherein the connection terminals are disposed inwardly to be spaced apart from an edge of a surface of the body on which the connection terminals are disposed.

13 Claims, 5 Drawing Sheets

(56) References Cited

U.S. PATENT DOCUMENTS

| | | | |
|---|---|---|---|
| 2014/0268487 A1* | 9/2014 | Yoshida | H01G 2/065 |
| | | | 361/301.4 |
| 2014/0284089 A1* | 9/2014 | Hattori | H05K 1/141 |
| | | | 174/258 |
| 2014/0355175 A1 | 12/2014 | Lee et al. | |
| 2015/0021077 A1* | 1/2015 | Chae | H01G 4/30 |
| | | | 174/260 |
| 2015/0270068 A1* | 9/2015 | Hattori | H01G 4/30 |
| | | | 361/301.4 |

* cited by examiner

ELECTRONIC COMPONENT AND BOARD HAVING THE SAME

CROSS-REFERENCE TO RELATED APPLICATION

This application claims the priority and benefit of Korean Patent Application No. 10-2015-0010568, filed on Jan. 22, 2015 with the Korean Intellectual Property Office, the disclosure of which is incorporated herein by reference.

BACKGROUND

The present disclosure relates to an electronic component and a board having the same.

As electronic components, there are capacitors, inductors, piezoelectric elements, varistors, thermistors, and the like.

A multilayer ceramic capacitor (MLCC), one of these ceramic electronic components, may have advantages such as a compact size, high capacitance, and ease of mountability.

The multilayer ceramic capacitor may be used as a chip type condenser mounted on printed circuit boards of several electronic products such as display devices including liquid crystal displays (LCDs), plasma display panels (PDPs), and the like, computers, personal digital assistants (PDAs), and mobile phones, and serving to charge and discharge electricity.

The multilayer ceramic capacitor may have a structure in which a plurality of dielectric layers and internal electrodes disposed between the dielectric layers and having different polarities are alternately stacked.

Since the dielectric layer as described above has piezoelectricity and electrostriction, when a direct current (DC) or alternating current (AC) voltage is applied to the multilayer ceramic capacitor, a piezoelectric phenomenon occurs between the internal electrodes, which causes vibration.

This vibration is transferred to a printed circuit board on which the multilayer ceramic capacitor is mounted through external electrodes of the multilayer ceramic capacitor, and thus an entire printed circuit board becomes a sound reflecting surface to transmit the sound of vibrations as noise.

The sound of vibrations may correspond to an audio frequency range of 20 Hz to 20,000 Hz, potentially causing user discomfort. The vibration noise causing listener discomfort as described above is called acoustic noise.

In general, the multilayer ceramic capacitor is mounted on a circuit board by bonding the external electrodes of the multilayer ceramic capacitor and electrode pads of the circuit board to each other using solder. When the soldering as described above is performed, the solder may contact a body of the multilayer ceramic capacitor in addition to the external electrodes thereof. In this case, acoustic noise may be generated in the multilayer ceramic capacitor.

SUMMARY

An aspect of the present disclosure may provide an electronic component capable of decreasing acoustic noise and being stably mounted, and a board having the same.

According to an aspect of the present disclosure, an electronic component may include: a body having upper and lower surfaces, first and second side surfaces, and third and fourth side surfaces; external electrodes disposed on at least one of the upper and lower surfaces and the third and fourth side surfaces of the body; and connection terminals disposed on the external electrodes, wherein the connection terminals are disposed inwardly to be spaced apart from an edge of a surface of the body on which the connection terminals are disposed.

According to another aspect of the present disclosure, a board having an electronic component may include: the electronic component including a body having upper and lower surfaces, first and second side surfaces, and third and fourth side surfaces, external electrodes disposed on at least one of the upper and lower surfaces and the third and fourth side surfaces of the body, and connection terminals disposed on the external electrodes; and a printed circuit board including electrode pads connected to the connection terminals, and a board on which the electrode pads are disposed, wherein the connection terminals are disposed inwardly to be spaced apart from an edge of a surface of the body on which the connection terminals are disposed.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

In addition, prior to the description, directions in the present disclosure will be defined. L, W, and T illustrated in FIG. 1 refer to a length direction, a width direction, and a thickness direction, respectively.

Electronic Component

Figure 1:
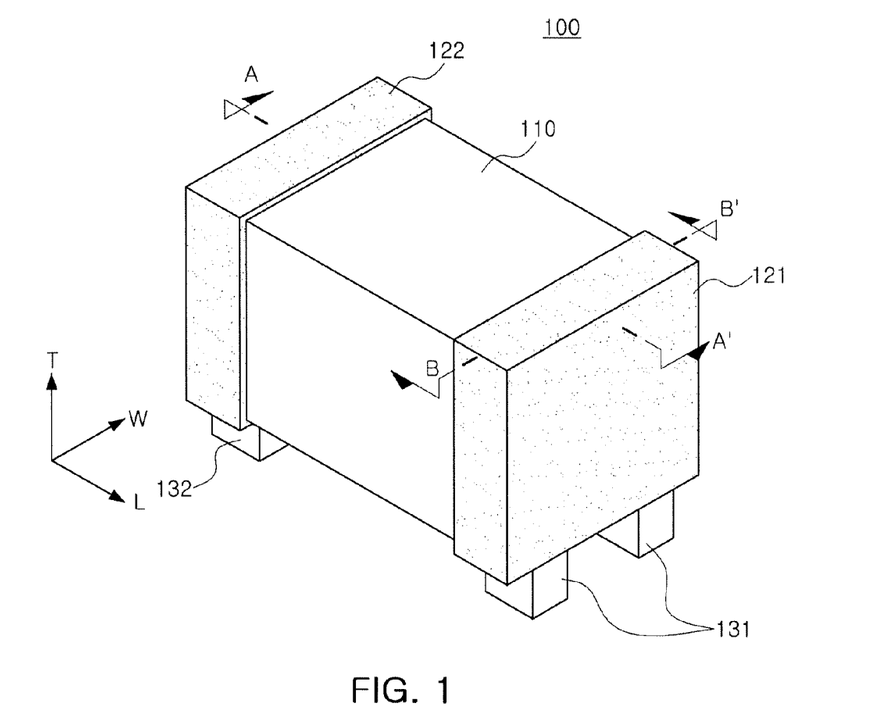
FIG. 1 is a perspective view of an electronic component according to an exemplary embodiment in the present disclosure.
Figure 2:
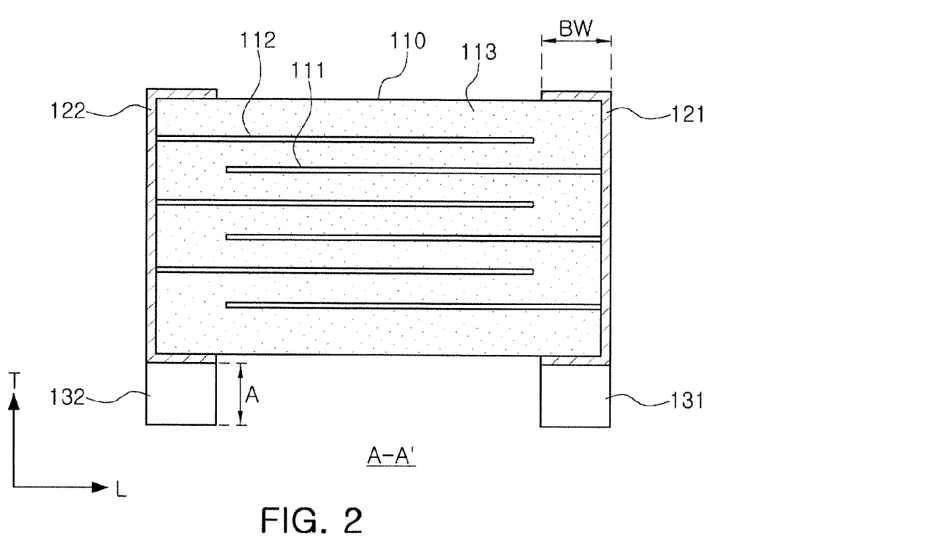
FIG. 2 is a cross-sectional view taken along line A-A' of FIG. 1.
Figure 3:
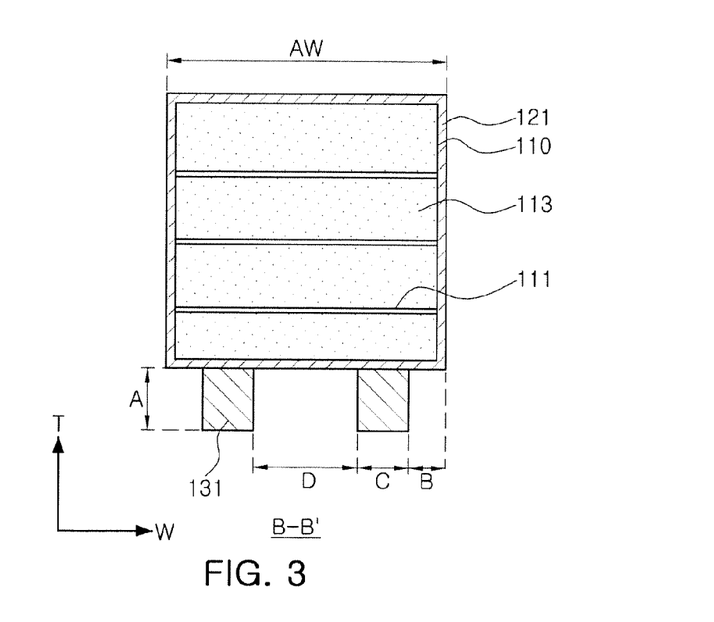
FIG. 3 is a cross-sectional view taken along line B-B' of FIG. 1.

FIG. 1 is a perspective view of an electronic component 100 according to an exemplary embodiment in the present disclosure, FIG. 2 is a cross-sectional view taken along line A-A' of FIG. 1, and FIG. 3 is a cross-sectional view taken along line B-B' of FIG. 1.

Referring to FIGS. 1 through 3, the electronic component 100 according to the exemplary embodiment may include a body 110 having upper and lower surfaces, first and second side surfaces, and third and fourth side surfaces of the body 110, external electrodes 121 and 122 disposed on at least one of the upper and lower surfaces and the third and fourth side surfaces, and connection terminals 131 and 132 disposed on the external electrodes 131 and 132, wherein the connection terminals 131 and 132 are disposed inwardly to be spaced apart from an edge of a surface of the body 110 on which the connection terminals 131 and 132 are disposed.

The body 110 illustrated in FIGS. 1 through 3 may be formed by stacking a plurality of dielectric layers 113 in the thickness direction and then sintering the stacked dielectric layers 113, and dielectric layers 113 adjacent to one another may be integrated so as to be difficult to discern a boundary therebetween. Here, the body 110 may have a hexahedral shape.

Referring to FIG. 2, in the electronic component 100 according to the exemplary embodiment, the dielectric layers 113 and first and second internal electrodes 111 and 112 disposed on upper surfaces of the dielectric layers 113 may be stacked and disposed. The first and second internal electrodes 111 and 112 may be alternately disposed with each of the dielectric layers 113 interposed therebetween, to be exposed to one sides of the dielectric layers 113. The stacked dielectric layers 113 and first and second internal electrodes 111 and 112 may be variously changed, and are not limited to the exemplary embodiment illustrated in FIG. 2.

The dielectric layer 113 may contain a ceramic material having high permittivity such as a barium titanate ($BaTiO_3$) based ceramic powder, or the like. However, the material of the dielectric layer 111 is not limited thereto as long as sufficient capacitance may be obtained. In addition, the dielectric layer 113 may further contain various ceramic additives such as transition metal oxides or carbides, a rare earth element, magnesium (Mg), aluminum (Al), or the like, an organic solvent, a plasticizer, a binder, a dispersant, and the like, in addition to the ceramic powder, as needed.

The first and second internal electrodes 111 and 112, which are electrodes having different polarities from each other, may be formed on ceramic sheets forming the dielectric layers 113 to be spaced apart from each other.

The first and second internal electrodes 111 and 112 may be formed of a conductive metal, for example, any one of silver (Ag), lead (Pb), platinum (Pt), nickel (Ni), and copper (Cu), alloys thereof, or the like, but the material of the first and second internal electrodes 111 and 112 is not limited thereto.

The first and second internal electrodes 111 and 112 may be disposed in the body 110 to overlap each other with each of the dielectric layers 113 interposed therebetween. Further, the first and second internal electrodes 111 and 112 may be exposed to at least one surface of the body 110 to thereby be electrically connected to the first and second external electrodes 121 and 121, respectively, and applied with voltages having different polarities from each other by the first and second external electrodes 121 and 122. In this case, capacitance may be formed by an overlapping portion between the first and second internal electrodes 111 and 112.

The first and second external electrodes 121 and 122 may be formed on both side surfaces of the body 110 in the length direction to cover the first and second internal electrodes 111 and 112 exposed to both side surfaces of the body 110 in the length direction to thereby be electrically connected to the first and second internal electrodes 111 and 112, respectively. The first external electrode 121 may be extended from the first side surface of the body to a portion of the lower surface of the body, and the second external electrode 122 may be extended from the second side surface of the body to a portion of the lower surface of the body.

The first and second external electrodes 121 and 122 as described above may be formed of a conductive metal, for example, at least one of silver (Ag), lead (Pb), platinum (Pt), nickel (Ni), and copper (Cu), alloys thereof, or the like, but the material of the first and second external electrodes 121 and 122 is not limited thereto.

Meanwhile, first and second plating layers (not illustrated) may be formed on the first and second external electrodes 121 and 122, as needed. The first and second plating layers may include nickel (Ni) plating layers formed on the first and second external electrodes 121 and 122 and tin (Sn) plating layers formed on the nickel plating layers.

The purpose of the first and second plating layers as described above is to increase adhesive strength between the electronic component 100 and a printed circuit board when the electronic component 100 is mounted on the printed circuit board, or the like, by solder. The plating may be performed by a method known in the art, and lead-free plating may be preferable in consideration of eco-friendly factors, but a method of forming the plating layers is not limited thereto.

The connection terminals 131 and 132 may be disposed on the external electrodes 121 and 122. The connection terminals 131 and 132 may be disposed inwardly to be spaced apart from a edge of a surface of the body 110 on which the connection terminals 131 and 132 are disposed.

Generally, an electronic component may be mounted on a printed circuit board by a soldering method of bonding electrode pads disposed on the printed circuit board and external electrodes of the electronic component to each other using solder containing a conductive material. When the soldering method as described above is performed, the solder may contact a body of the component in addition to the external electrodes thereof. In this case, acoustic noise may be generated in the electronic component.

Since, in the electronic component 100 according to the exemplary embodiment, the connection terminals 131 and 132 are disposed on one surfaces of the external electrodes 121 and 122, an amount of solder contacting the body 110 of the electronic component at when the soldering method is performed may be decreased. Further, an amount of the solder contacting the body 110 of the electronic component 100 may be more effectively decreased by specifying positions at which the connection terminals 131 and 132 are disposed, and thus acoustic noise may be decreased. In addition, adhesion between the electronic component 100 and the printed circuit board may be maintained, and thus the electronic component 100 may be stably mounted on the printed circuit board.

In a case in which the first external electrode 121 is extended from the first side surface of the body to the portion of the lower surface of the body 110 and the second external electrode 122 is extended from the second side surface of the body 110 to the portion of the lower surface of the body 110, the first connection terminal 131 may be disposed inwardly on the lower surface of the body 110 to be spaced apart from the third or fourth side surface of the body 110, and the second connection terminal 131 may be disposed inwardly on the lower surface of the body 110 to be spaced part from the third or fourth side surface of the body 110.

Since the connection terminals 131 and 132 electrically connect the external electrodes 121 and 122 of the electronic component 100 to electrode pads of the printed circuit board, the connection terminals 131 and 132 may contain a conductive material. In this case, the connection terminals 131 and 132 may contain the same material as the material constituting the external electrodes 121 and 122 in order to increase conductivity and adhesion between the external electrodes 121 and 122 and the connection terminals 131 and 132. Therefore, the connection terminals 131 and 132 may be formed of one of silver (Ag), lead (Pb), platinum (Pt), nickel (Ni), and copper (Cu), alloys thereof, or the like, but the material of the connection terminals 131 and 132 is not limited thereto.

An example of a method of disposing the connection terminals 131 and 132 on the external electrodes 121 and 122 may include a method of bonding separately manufactured connection terminals 131 and 132 by electric welding, a method of forming the connection terminals on the external electrodes 121 and 122 using an electroforming method, or the like, but is not limited thereto.

Referring to FIGS. 1 through 3, the connection terminals 131 and 132 may have a square pillar shape. However, the connection terminals 131 and 132 may have various shapes such as a pillar shape of which one surface is a trapezoidal shape, a semi-spherical shape, and the like. In a case in which the connection terminals 131 and 132 are formed in various shapes such as the pillar shape of which one surface is a trapezoidal shape, the semi-spherical shape, and the like, as described above, a space in which solder may be provided may be increased, which may be more effective in view of decreasing acoustic noise.

Referring to FIGS. 2 and 3, a direction in which the first and second side surfaces of the body 110 oppose each other refers to a length (L) direction, a direction in which the third and fourth side surfaces of the body 110 oppose each other refers to a width (W) direction, a direction in which the upper and lower surfaces of the body 110 oppose each other refers to a thickness (T) direction, and the electronic component may satisfy $0.194<A/C<5.256$ in which A is a thickness of the connection terminals 131 and 132, and C is a width of the connection terminals 131 and 132.

When the thickness of the connection terminals 131 and 132 is excessively thin, when soldering is performed, a space in which the solder is provided between the body 110 of the electronic component 110 and the electrode pads of the printed circuit board may be decreased, and thus the solder may contact the body 110 of the electronic component 100. In this case, an effect of decreasing acoustic noise may be deteriorated. Further, when the thickness of the connection terminals 131 and 132 is excessively thick, when soldering is performed, the solder may adhere only to side surfaces of the connection terminals 131 and 132, an amount of the solder adhered to the external electrodes 121 and 122 of the electronic component 100 may be decreased, and the body 110 of the electronic component 100 may be disposed at a high position from the printed circuit board, and thus mounting stability of the electronic component 100 may be decreased.

When the width of the connection terminals 131 and 132 is excessively wide, when soldering is performed, a space in which the solder is provided between the body 110 of the electronic component 110 and the electrode pads of the printed circuit board may be decreased, and thus the solder may contact the body 110 of the electronic component 100. In this case, an effect of decreasing acoustic noise may be deteriorated. Further, when the width of the connection terminals 131 and 132 is excessively narrow, a contact area between the electronic component 100 and the printed circuit board may be decreased, and thus mounting stability of the electronic component 100 may be decreased.

According to the present disclosure, acoustic noise may be decreased and mounting stability may be improved by adjusting the thickness and the width of the connection terminals 131 and 132. In a case in which the ratio A/C of the thickness A to the width C of the connection terminals 131 and 132 is 5.25 or more, mounting stability may be decreased, and in a case in which the ratio A/C is 0.194 or less, acoustic noise may be increased. Therefore, the electronic component may satisfy $0.194<A/C<5.256$, and thus mounting stability may be improved, and acoustic noise may be decreased.

Referring to FIGS. 2 and 3, when a distance between the connection terminals 131 and 132 spaced inwardly from an edge of the surface of the body 110 on which the connection terminals 131 and 132 are disposed and the edge of the surface of the body 110 on which the connection terminals 131 and 132 are disposed is defined as B and a width of the body 110 is defined as AW, the electronic component may satisfy $0.01<B/AW<0.5$.

Further, in a case in which the first external electrode 121 is extended from the first side surface of the body to the portion of the lower surface of the body 110 and the second external electrode 122 is extended from the second side surface of the body 110 to the portion of the lower surface of the body 110, the first connection terminal 131 may be disposed inwardly on the lower surface of the body 110 to be spaced apart from the third or fourth side surface of the body 110, and the second connection terminal 131 may be disposed inwardly on the lower surface of the body 110 to be spaced part from the third or fourth side surface of the body 110. In this case, when a distance between first and second connection terminals 131 and 132 disposed inwardly on the lower surface of the body 110 to be spaced from the third or fourth side surface of the body 110 and the third or fourth side surface is defined as B and the width of the body 110 is defined as AW, the electronic component may satisfy $0.01<B/AW<0.5$.

In general, when soldering is performed, the solder may adhere to the side surface of the body 110 of the electronic component 100 mounted on the printed circuit board, thereby generating acoustic noise. According to the exemplary embodiment, the connection terminals 131 and 132 may be disposed inwardly to be spaced apart from one side surface of the body 110 by a predetermined distance, and thus when soldering is performed, the solder may be disposed at spaced portions of the connection terminals 131 and 132, thereby preventing the solder from rising along the side surface of the body 110 of the electronic component 100 and being adhered thereto.

In a case in which the distance B of the connection terminals 131 and 132 spaced inwardly of the body 110 is large, a space in which the solder is disposed may be increased, which may be advantageous in decreasing acoustic noise. However, since the connection terminals 131 and 132 may not stably support the electronic component 100, a problem in mounting stability may occur. In a case in which the distance B of the connection terminals 131 and 132 spaced inwardly of the body 110 is small, since the connection terminals 131 and 132 may stably support the electronic component 100, mounting stability may be increased. However, the space in which the solder is disposed may not be sufficient, and thus the solder may rise along the side surface of the body 110 of the electronic component 100, thereby causing acoustic noise.

Since the connection terminals 131 and 132 are disposed inwardly of the body 110 to be spaced apart from both side surfaces of the body 110 by the distance B on a thickness-width (T-W) plane of the body 110, in a case in which the width AW of the body 110 is wide, the electronic component may be more stably mounted.

According to the present disclosure, acoustic noise may be decreased and mounting stability may be improved by adjusting the distance B of the connection terminals 131 and 132 spaced inwardly of the body 110. In a case in which a ratio $B/AW$ of the distance B of the connection terminals 131 and 132 spaced inwardly of the body 110 to the width AW of the body 110 is 0.5 or more, mounting stability may be decreased, and in a case in which the ratio $B/AW$ is 0.01 or less, acoustic noise may be increased. Therefore, the electronic component may satisfy $0.01<B/AW<0.5$, and thus mounting stability may be improved, and acoustic noise may be decreased.

Referring to FIGS. 2 and 3, the external electrodes 121 and 122 may be disposed to contact corners at which the upper and lower surfaces and the third and fourth side surfaces of the body 110 of the electronic component 100 meet the first and second side surfaces thereof, and two connection terminals 131 and two connection terminals 132 may be disposed on the external electrodes 121 and 122, respectively, to be spaced apart from each other in the width direction. In this case, when the thickness of the connection terminals 131 and 132 is defined as A, the width of the body 110 is defined as AW, a distance between the connection terminals 131 or 132 spaced apart from each other is defined as D, and a length of portions of the external electrodes 121 and 122 disposed on the upper or lower surface, or the third or fourth side surface of the body 110 is defined as BW, the electronic component may satisfy $0.0510<(A \times D)/(AW \times BW)<1.4805$.

Further, in a case in which the first external electrode 121 is extended from the first side surface of the body to the portion of the lower surface of the body 110 and the second external electrode 122 is extended from the second side surface of the body 110 to the portion of the lower surface of the body 110, the first connection terminal 131 may be disposed inwardly on the lower surface of the body 110 to be spaced apart from the third or fourth side surface of the body 110, and the second connection terminal 131 may be disposed inwardly on the lower surface of the body 110 to be spaced part from the third or fourth side surface of the body 110. In this case, two first connection terminals 131 may be disposed on the first external electrode 121 to be spaced apart from each other in the width (W) direction, two second connection terminals 132 may be disposed on the second external electrode 122 to be spaced apart from each other in the width (W) direction, and when the thickness of the connection terminals 131 and 132 is defined as A, a distance between the first connection terminals 131 spaced apart from each other and a distance between the second connection terminals 132 spaced apart from each other is defined as D, the width of the body 110 is defined as AW, and a length of a portion of the first external electrode 121 disposed on the lower surface of the body 110 and a length of a portion of the second external electrode 122 disposed on the lower surface of the body 110 is defined as BW, the electronic component may satisfy $0.0510<(A \times D)/(AW \times BW)<1.4805$.

In a case in which the distance D between the connection terminals 131 or 132 spaced apart from each other is large, the space in which the solder is disposed may be increased, which may be advantageous in decreasing acoustic noise. However, contact areas of the connection terminals 131 and 132 and the printed circuit board may be decreased, and thus a problem in mounting stability may occur. In a case in which the distance D between the connection terminals 131 or 132 spaced apart from each other is small, since the connection terminals 131 and 132 may stably support the electronic component 100, mounting stability may be increased. However, the space in which the solder is disposed may not be sufficient, and thus acoustic noise may be generated.

When the thickness A of the connection terminals 131 and 132 is increased, acoustic noise may be decreased, but mounting stability may be decreased, and when the thickness A of the connection terminals 131 and 132 is decreased, acoustic noise may be increased, but the mounting stability may be increased.

Since the connection terminals 131 and 132 are disposed inwardly of the body 110 to be spaced apart from both side surfaces of the body 110 by the distance B on the thickness-width (T-W) plane of the body 110, in a case in which the width AW of the body 110 is wide, mounting stability of the electronic component 110 may be increased, and in a case in which the width AW of the body 110 is narrow, mounting stability of the electronic component 110 may be decreased.

When the length BW of the portions of the external electrodes 121 and 122 disposed on the upper or lower surface or the third or fourth side surface of the body 110 is long, a length of the connection terminals 131 and 132 disposed on the external electrodes 121 and 122 may be increased, and a contact area between the connection terminals 131 and 132 and the printed circuit board may be increased, and thus mounting stability of the electronic component 100 may be increased, and when the length BW of the portions of the external electrodes 121 and 122 disposed on the upper or lower surface or the third or fourth side surface of the body 110 is short, the contact area between the connection terminals 131 and 132 and the printed circuit board may be decreased, and thus mounting stability of the electronic component 100 may be decreased.

According to the present disclosure, acoustic noise may be decreased and mounting stability may be improved by adjusting A×D and AW×BW, wherein A×D is an item associated with the distance D between the connection terminals 131 or 132 spaced apart from each other and the thickness A of the connection terminals 131 and 132 and AW×BW is an item associated with the width AW of the body 110 and the length BW of the portions of the external electrodes 121 and 122 disposed on the upper or lower surface, or the third or fourth side surface of the body 110. In a case in which (A×D)/(AW×BW) is more than 1.4805, mounting stability may be decreased, and in a case in which (A×D)/(AW×BW) is less than 0.0510, acoustic noise may be increased. Therefore, the electronic component may satisfy 0.0510<(A×D)/(AW×BW)<1.4805, and thus mounting stability may be improved and acoustic noise may be decreased.

Figure 4:
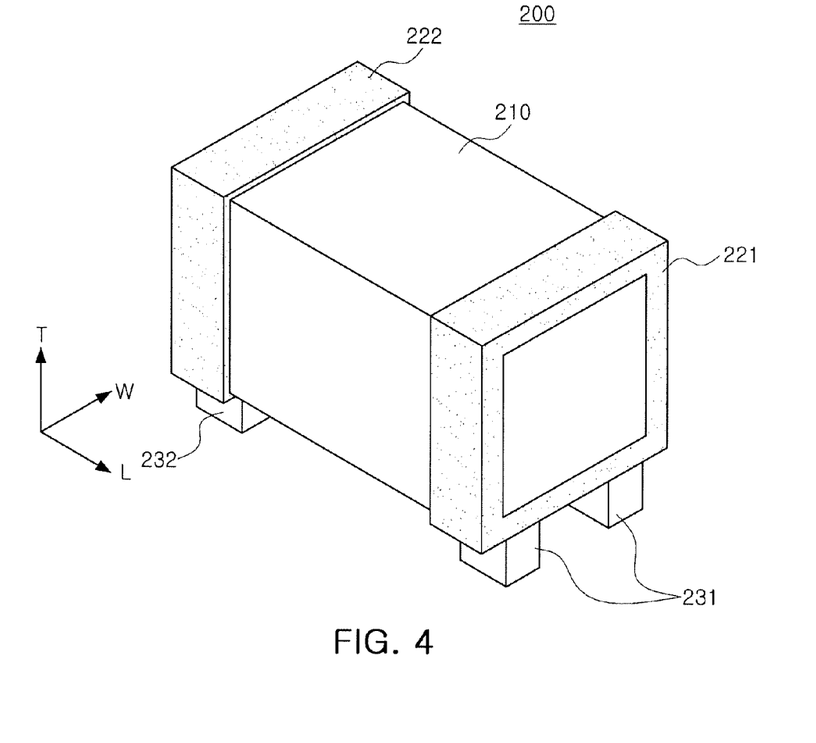
FIGS. 4 and 5 are perspective views of electronic components according to other exemplary embodiments in the present disclosure.
Figure 5:
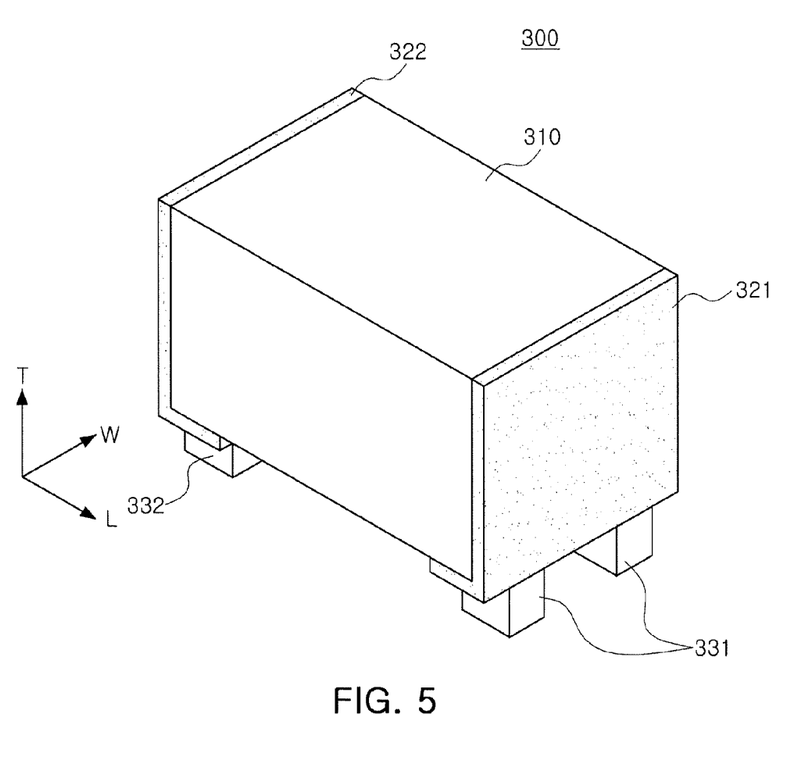

The external electrodes 121 and 122 of the electronic component 100 according to the exemplary embodiment may be disposed on at least one of the first and second side surfaces of the body 110, and extended to at least one of the upper and lower surfaces and the third and fourth side surfaces of the body 110. Further, referring to FIG. 4, external electrodes 121 and 122 are not disposed on first and second side surfaces of a body 210 but may be disposed to be extended from sides at which the first and second side surfaces of the body 210 meet upper and lower surfaces and third and fourth side surfaces of the body 210 to at least one of the upper and lower surfaces and the third and fourth side surfaces of the body 210. In addition, referring to FIG. 5, external electrodes 321 and 322 may be extended only to a lower surface of a body 310.

Results obtained by evaluating acoustic noise and mounting stability depending on A/C and (A×D)/(AW×BW) values as described above are illustrated in the following Table 1. Acoustic noise and mounting stability in Inventive Examples 1 to 11 according to the exemplary embodiment and in Comparative Examples 1 to 5 different from the exemplary embodiment in the present disclosure were measured.

In order to measure the acoustic noise, after one sample (multilayer capacitor) per aboard for measuring acoustic noise was mounted on a printed circuit board in a direction in which upper and lower portions of the sample were distinguished, the board was mounted on a jig for measurement. In addition, DC voltage and voltage variation were applied to both terminals of the sample mounted on the jig for measurement using a DC power supply and a function generator. The acoustic noise was measured through a microphone installed directly above the printed circuit board.

The mounting stability was evaluated by observing presence or absence of position misalignment or a leaning defect of the electronic component after the electronic component was mounted on a printed circuit board. A case in which the position misalignment or the leaning defect of the electronic component was observed was represented by symbol "X", and a case in which there was no position misalignment or leaning defect was represented by symbol "O".

TABLE 1

| Sample | A (um) | B (um) | C (um) | D (um) | L (um) | AW (um) | BW (um) | B/AW | A/C | (A × D)/ (AW × BW) | Acoustic Noise (dBA) | Mounting Stability Evaluation |
|---|---|---|---|---|---|---|---|---|---|---|---|---|
| Comparative Example 1 | 39.6 | 136.9 | 203.6 | 761.3 | 2130.1 | 1369.1 | 431.5 | 0.100 | 0.194 | 0.051 | 45.1 | o |
| Inventive Example 1 | 85.8 | 136.9 | 200.4 | 771.7 | 2131 | 1368.5 | 430.7 | 0.100 | 0.428 | 0.1123 | 39.8 | o |
| Inventive Example 2 | 106.1 | 136.8 | 198.7 | 769 | 2122.5 | 1368.4 | 400.1 | 0.100 | 0.534 | 0.149 | 37.9 | o |
| Inventive Example 3 | 157 | 136.9 | 196.6 | 765.7 | 2126.1 | 1368.9 | 410.8 | 0.100 | 0.799 | 0.2138 | 39.1 | o |
| Inventive Example 4 | 80.1 | 136.7 | 201.5 | 768.7 | 2122.8 | 1366.9 | 427.9 | 0.100 | 0.398 | 0.1053 | 37.5 | o |
| Inventive Example 5 | 200 | 136.7 | 200.1 | 759.8 | 2125.6 | 1367.2 | 430.1 | 0.100 | 1 | 0.2584 | 33.1 | o |
| Inventive Example 6 | 523.6 | 136.9 | 200.8 | 753.6 | 2128.1 | 1368.8 | 425.6 | 0.100 | 2.608 | 0.6773 | 24.1 | o |
| Comparative Example 2 | 1048.6 | 136.7 | 199.5 | 769.8 | 2126.5 | 1366.8 | 398.9 | 0.100 | 5.256 | 1.4805 | 23.1 | x |
| Comparative Example 3 | 2151.6 | 136.9 | 210.3 | 746.4 | 2134.1 | 1369.2 | 419.5 | 0.100 | 10.231 | 2.796 | 22.8 | x |

TABLE 1-continued

| Sample | A (um) | B (um) | C (um) | D (um) | L (um) | AW (um) | BW (um) | B/AW | A/C | (A × D)/ (AW × BW) | Acoustic Noise (dBA) | Mounting Stability Evaluation |
|---|---|---|---|---|---|---|---|---|---|---|---|---|
| Comparative Example 4 | 3458.7 | 136.8 | 205.4 | 740.4 | 2131.9 | 1367.8 | 411.8 | 0.100 | 16.839 | 4.5464 | 23.3 | x |
| Comparative Example 5 | 4583.5 | 136.8 | 250.6 | 655.7 | 2126.8 | 1368.1 | 421.3 | 0.100 | 18.29 | 5.2143 | 22.1 | x |
| Inventive Example 6 | 90.7 | 136.8 | 197.6 | 835.7 | 2125.6 | 1367.5 | 422.8 | 0.100 | 0.459 | 0.1311 | 39.9 | o |
| Inventive Example 7 | 90.1 | 136.8 | 198.3 | 793.6 | 2130.8 | 1368.4 | 424.6 | 0.100 | 0.454 | 0.1231 | 38.1 | o |
| Inventive Example 8 | 91 | 137.0 | 200.1 | 948.4 | 2134.1 | 1370 | 401.8 | 0.100 | 0.455 | 0.1568 | 37.2 | o |
| Inventive Example 9 | 89.5 | 136.6 | 201.4 | 933.2 | 2125.3 | 1366.2 | 399.8 | 0.100 | 0.444 | 0.1529 | 36.9 | o |
| Inventive Example 10 | 83.6 | 136.8 | 199.8 | 741.5 | 2126.1 | 1368.1 | 428.3 | 0.100 | 0.418 | 0.1058 | 37.5 | o |
| Inventive Example 11 | 90.2 | 136.8 | 200.6 | 565 | 2122.9 | 1367.8 | 422.1 | 0.100 | 0.45 | 0.0883 | 39.5 | o |

Referring to Table 1, in a case in which A/C was more than 0.194, the measured acoustic noise was less than 45 dBA, and in a case in which A/C was more than 0.799, the measured acoustic noise was less than 35 dBA. Further, in a case in which A/C was 5.256 or more, it was judged that a mounting defect occurred. Therefore, it may be appreciated that in order to decrease acoustic noise and improve mounting stability, A/C needs to satisfy 0.194<A/C<5.256, preferably 0.799<A/C<5.256.

Meanwhile, in a case in which (A×D)/(AW×BW) was more than 0.051, the measured acoustic noise was less than 45 dBA, and in a case in which A/C was more than 0.2138, the measured acoustic noise was less than 35 dBA. Further, in a case in which (A×D)/(AW×BW) was 1.4805 or more, it was judged that amounting defect occurred. Therefore, it may be appreciated that in order to decrease acoustic noise and improve mounting stability, (A×D)/(AW×BW) needs to satisfy 0.0510<(A×D)/(AW×BW)<1.4805, preferably, 0.2138<(A×D)/(AW×BW)<5.256.

Results obtained by evaluating acoustic noise and mounting stability depending on B/AW values as described above are illustrated in the following Table 2. Acoustic noise and mounting stability in Inventive Examples 12 to 18 according to the exemplary embodiment and in Comparative Examples 6 to 13 different from the exemplary embodiment were measured. A method of evaluating the acoustic noise and mounting stability was the same as in Table 1.

TABLE 2

| Sample | A (um) | B (um) | C (um) | D (um) | L (um) | AW (um) | BW (um) | B/AW | A/C | (A × D)/ (AW × BW) | Acoustic Noise (dBA) | Mounting Stability Evaluation |
|---|---|---|---|---|---|---|---|---|---|---|---|---|
| Comparative Example 6 | 200.1 | 0.0 | 200.6 | 759.8 | 2130.1 | 1369.1 | 431.5 | 0.000 | 1.00 | 0.26 | 48.5 | o |
| Comparative Example 7 | 200 | 6.8 | 200.4 | 759.7 | 2131 | 1368.5 | 430.7 | 0.005 | 1.00 | 0.26 | 44.8 | o |
| Comparative Example 8 | 200 | 9.6 | 200.7 | 759.9 | 2132.5 | 1368.4 | 430.1 | 0.007 | 1.00 | 0.26 | 44.5 | o |
| Comparative Example 9 | 200.2 | 9.6 | 200.6 | 759.8 | 2133.1 | 1368.9 | 430.8 | 0.007 | 1.00 | 0.26 | 43.5 | o |
| Comparative Example 10 | 200.2 | 10.9 | 200.5 | 759.8 | 2135.8 | 1367.9 | 432.9 | 0.008 | 1.00 | 0.26 | 41.7 | o |
| Comparative Example 11 | 200 | 13.7 | 200.1 | 759.8 | 2135.6 | 1367.2 | 430.1 | 0.010 | 1.00 | 0.26 | 40.5 | o |
| Inventive Example 12 | 200 | 19.2 | 200.8 | 759.9 | 2138.1 | 1368.8 | 435.6 | 0.014 | 1.00 | 0.25 | 38.4 | o |
| Inventive Example 13 | 200.1 | 35.6 | 200.5 | 759.8 | 2136.5 | 1367.8 | 431.9 | 0.026 | 1.00 | 0.26 | 30.5 | o |
| Inventive Example 14 | 200.1 | 58.3 | 200.3 | 759.8 | 2134.1 | 1369.2 | 432.5 | 0.043 | 1.00 | 0.26 | 29.5 | o |
| Inventive Example 15 | 200 | 99.3 | 200.4 | 759.7 | 2131.9 | 1367.8 | 431.8 | 0.073 | 1.00 | 0.26 | 27.5 | o |
| Inventive Example 16 | 200 | 171.0 | 200.6 | 759.8 | 2136.8 | 1368.1 | 431.3 | 0.125 | 1.00 | 0.26 | 22.1 | o |
| Inventive Example 17 | 200 | 484.8 | 200.6 | 759.9 | 2135.6 | 1369.5 | 432.8 | 0.354 | 1.00 | 0.26 | 20.5 | o |
| Inventive Example 18 | 200.1 | 597.6 | 200.3 | 759.8 | 2130.8 | 1368.4 | 434.6 | 0.437 | 1.00 | 0.26 | 21 | o |
| Comparative Example 12 | 200 | 684.5 | 200.1 | 759.8 | 2134.1 | 1369 | 431.8 | 0.500 | 1.00 | 0.26 | 19.9 | x |
| Comparative Example 13 | 200 | 935.6 | 200.4 | 759.7 | 2135.3 | 1367.2 | 434.8 | 0.684 | 1.00 | 0.26 | 20.7 | x |

Referring to Table 2, in a case in which B/AW was more than 0.01, the measured acoustic noise was less than 45 dBA, and in a case in which B/AW was more than 0.014, the measured acoustic noise was less than 35 dBA. Further, in a case in which B/AW was 0.5 or more, it was judged that a mounting defect occurred. Therefore, it may be appreciated that in order to decrease acoustic noise and improve mounting stability, B/AW needs to satisfy 0.01<B/AW<0.5, preferably, 0.014<B/AW<0.5.

Board Having Electronic Component

Figure 6:
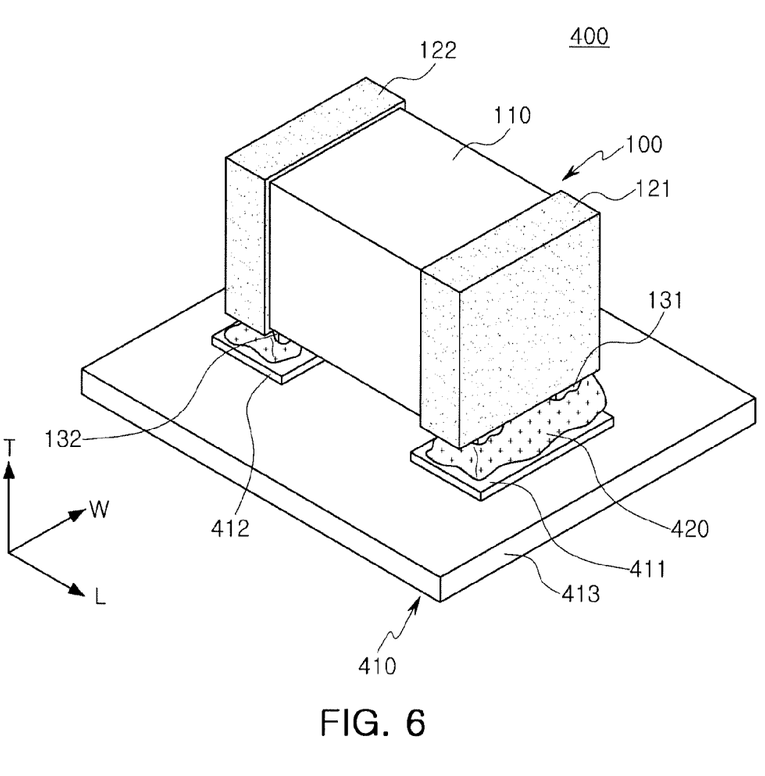
FIG. 6 is a perspective view of a board having an electronic component according to an exemplary embodiment in the present disclosure.

FIG. 6 is a perspective view of a board 400 having an electronic component according to an exemplary embodiment in the present disclosure.

Referring to FIG. 6, the board 400 having an electronic component according to the exemplary embodiment may include the electronic component including a body 110 having upper and lower surfaces, first and second side surfaces, and third and fourth side surfaces, external electrodes 121 and 122 disposed on at least one of the upper and lower surfaces and the third and fourth side surfaces of the body 110, and connection terminals 131 and 132 disposed on the external electrodes 121 and 122; and a printed circuit board 410 including electrode pads 411 and 412 connected to the connection terminals 131 and 132, and a board 413 on which the electrode pads 411 and 412 are disposed, wherein the connection terminals 131 and 132 are disposed inwardly to be spaced apart from an edge of a surface of the body 110 on which the connection terminals 131 and 132 are disposed.

The connection terminals 131 and 132 disposed on the first and second external electrodes 121 and 122 may be bonded to first and second electrode pads 411 and 412 of the printed circuit board 410, respectively, through solder 420.

The electronic component 100 mounted on the board 400 having an electronic component according to the exemplary embodiment may be the same as the electronic component 100 according to the exemplary embodiment described above. Further, a method of mounting the electronic component 100 on the printed circuit board 410 is the same as the method as described above.

As set forth above, according to exemplary embodiments, the electronic component and the board having the same may be provided, whereby the acoustic noise may be decreased, and the electronic component may be stably mounted.

While exemplary embodiments have been shown and described above, it will be apparent to those skilled in the art that modifications and variations could be made without departing from the scope of the present invention as defined by the appended claims.

What is claimed is:

1. An electronic component comprising:
a body having upper and lower surfaces, first and second side surfaces, and third and fourth side surfaces;
external electrodes disposed on at least one of the upper and lower surfaces and the third and fourth side surfaces of the body; and
connection terminals disposed on the external electrodes, wherein the connection terminals are disposed inwardly to be spaced apart from an edge of a surface of the body on which the connection terminals are disposed, and
wherein a direction in which the first and second side surfaces of the body oppose each other refers to a length (L) direction, a direction in which the third and fourth side surfaces of the body oppose each other refers to a width W direction and a direction in which the upper and lower surfaces of the body oppose each other refers to a thickness (T) direction, and 0.194<A/C<5.256 in which A is a thickness of the connection terminals, and C is a width of the connection terminals.

2. The electronic component of claim 1, wherein 0.799<A/C<5.256.

3. The electronic component of claim 1, wherein 0.01<B/AW<0.5 in which B is a distance between the connection terminals spaced inwardly from the edge of the surface of the body on which the connection terminals are disposed and the edge of the surface of the body on which the connection terminals are disposed, and AW is a width of the body.

4. The electronic component of claim 3, wherein 0.014<B/AW<0.5.

5. The electronic component of claim 1, wherein the external electrodes are disposed to contact corners at which the upper and lower surfaces and the third and fourth side surfaces of the body meet the first and second side surfaces thereof, and two connection terminals are disposed on each of the external electrodes to be spaced apart from each other in the width (W) direction, and 0.0510<(A×D)/(AW×BW)<1.4805 in which A is a thickness of the connection terminals, AW is a width of the body, D is a distance between the connection terminals spaced apart from each other, and BW is a length of portions of the external electrodes disposed on the upper or lower surface, or the third or fourth side surface of the body.

6. The electronic component of claim 5, wherein 0.2138<(A×D)/(AW×BW)<1.4805.

7. The electronic component of claim 1, wherein the external electrodes are disposed on at least one of the first and second side surfaces of the body and extended to at least one of the upper and lower surfaces and the third and fourth side surfaces of the body.

8. An electronic component comprising:
a body having upper and lower surfaces, first and second side surfaces, and third and fourth side surfaces;
a first external electrode disposed to be extended from the first side surface of the body to a portion of the lower surface of the body;
a second external electrode disposed to be extended from the second side surface of the body to a portion of the lower surface of the body;
a first connection terminal disposed on the first external electrode disposed on the lower surface of the body; and
a second connection terminal disposed on the second external electrode disposed on the lower surface of the body,
wherein the first connection terminal is disposed inwardly on the lower surface of the body to be spaced apart from the third or fourth side surface of the body, and the second connection terminal is disposed inwardly on the lower surface of the body to be spaced apart from the third or fourth side surface of the body,
wherein two or more first connection terminals are disposed on the first external electrode to be spaced apart from each other in a width (W) direction, and two or more second connection terminals are disposed on the second external electrode to be spaced apart from each other in the width (W) direction.

9. The electronic component of claim 8, wherein a direction in which the first and second side surfaces of the body oppose each other refers to a length (L) direction, a direction in which the third and fourth side surfaces of the body oppose each other refers to a width (W) direction, and a direction in which the upper and lower surfaces of the body oppose each other refers to a thickness (T) direction, and 0.194<A/C<5.256 in which A is a thickness of the connection terminals, and C is a width of the connection terminals.

10. The electronic component of claim 8, wherein a direction in which the first and second side surfaces of the body oppose each other refers to a length (L) direction, a direction in which the third and fourth side surfaces of the body oppose each other refers to a width (W) direction, and a direction in which the upper and lower surfaces of the body oppose each other refers to a thickness (T) direction, and 0.01<B/AW<0.5 in which B is a distance between the first and second connection terminals disposed inwardly on the lower surface of the body to be spaced apart from the third or fourth side surface of the body and the third or fourth side surface of the body, and AW is a width of the body.

11. The electronic component of claim 10, wherein the direction in which the first and second side surfaces of the body oppose each other refers to the length (L) direction, the direction in which the third and fourth side surfaces of the body oppose each other refers to the width (W) direction, and the direction in which the upper and lower surfaces of the body oppose each other refers to the thickness (T) direction, two first connection terminals are disposed on the first external electrode to be spaced apart from each other in the width (W) direction, and two second connection terminals are disposed on the second external electrode to be spaced apart from each other in the width (W) direction, and 0.0510<(A×D)/(AW×BW)<1.4805 in which A is a thickness of the first and second connection terminals, D is a distance between the first connection terminals spaced apart from each other and between the second connection terminals spaced apart from each other, AW is a width of the body, and BW is a length of a portion of the first external electrode disposed on the lower surface of the body and a length of a portion of the second external electrode disposed on the lower surface of the body.

12. The electronic component of claim 8, wherein the first and second connection terminals have a square pillar shape.

13. A board having an electronic component, comprising:

the electronic component including a body having upper and lower surfaces, first and second side surfaces, and third and fourth side surfaces, external electrodes disposed on at least one of the upper and lower surfaces and the third and fourth side surfaces of the body, and connection terminals disposed on the external electrodes; and a printed circuit board including electrode pads connected to the connection terminals, and a board on which the electrode pads are disposed, wherein the connection terminals are disposed inwardly to be spaced apart from an edge of a surface of the body on which the connection terminals are disposed, and wherein a direction in which the first and second side surfaces of the body oppose each other refers to a length (L) direction, a direction in which the third and fourth side surfaces of the body oppose each other refers to a width (W) direction, and a direction in which the upper and lower surfaces of the body oppose each other refers to a thickness (T) direction, and 0.01<B/AW<0.5 in which B is a distance between the connection terminals spaced inwardly from the edge of the surface of the body on which the connection terminals are disposed and the edge of the surface of the body on which the connection terminals are disposed, and AW is a width of the body.

* * * * *